United States Patent
Bourget

(10) Patent No.: US 9,049,853 B1
(45) Date of Patent: Jun. 9, 2015

(54) HOOK SETTING FISHING POLE HOLDER

(76) Inventor: Michael A. Bourget, Niagara-on-the-Lake (CA)

( * ) Notice: Subject to any disclaimer, the term of this patent is extended or adjusted under 35 U.S.C. 154(b) by 470 days.

(21) Appl. No.: 13/617,183

(22) Filed: Sep. 14, 2012

(51) Int. Cl.
*A01K 97/12* (2006.01)

(52) U.S. Cl.
CPC .................................... *A01K 97/12* (2013.01)

(58) Field of Classification Search
USPC .......................................................... 43/15, 16
See application file for complete search history.

(56) References Cited

U.S. PATENT DOCUMENTS

| | | | |
|---|---|---|---|
| 1,549,405 A | 8/1925 | Bjurstrom | |
| 2,661,563 A | 12/1953 | Adams, Jr. et al. | |
| 2,811,801 A | 11/1957 | Daniel | |
| 2,898,697 A * | 8/1959 | Housman | 43/15 |
| 3,456,377 A * | 7/1969 | Niles | 43/15 |
| 3,619,931 A * | 11/1971 | Brummett | 43/15 |
| 3,824,730 A | 7/1974 | Johnson | |
| 4,012,861 A * | 3/1977 | Gellatly | 43/15 |
| 4,391,059 A * | 7/1983 | Cordova et al. | 43/15 |
| 4,397,113 A | 8/1983 | Pinson | |
| 4,476,645 A * | 10/1984 | Paarmann | 43/15 |
| 5,383,298 A * | 1/1995 | Engel | 43/15 |
| 5,533,294 A * | 7/1996 | Coulter | 43/15 |
| 5,873,191 A * | 2/1999 | Bova et al. | 43/15 |
| 5,987,801 A | 11/1999 | Anderson | |
| 6,094,852 A | 8/2000 | Roach | |
| 6,301,820 B1 * | 10/2001 | Rosa | 43/15 |
| 6,594,941 B1 | 7/2003 | Anderson | |
| 6,622,421 B1 | 9/2003 | Daniels | |
| 7,017,296 B2 * | 3/2006 | Templeman et al. | 43/15 |
| 2006/0026891 A1 * | 2/2006 | Witt | 43/15 |
| 2012/0151818 A1 * | 6/2012 | Orth | 43/4.5 |

* cited by examiner

*Primary Examiner* — Christopher P Ellis

(57) ABSTRACT

A hook setting fishing pole holder holds and secures a fishing pole to allow for unattended fishing includes a base having a pointed stake and a bracket that pivotably holds a fishing pole holder connected by an axle mechanism. The bracket is held between a pair of bracket flanges and the pole holder is secured in a ready position by a retaining clip. The axle mechanism allows the rod to be balanced and to slightly bob up and down as a line and bait are taken by a fish. The force of a fish strike and subsequent movement disengages the pole holder from the clip allowing the fishing pole to pivot forward. The forward motion is immediately limited by a stop feature which sets the hook.

20 Claims, 5 Drawing Sheets

HOOK SETTING FISHING POLE HOLDER

RELATED APPLICATIONS

Not Applicable.

FIELD OF THE INVENTION

The present invention relates generally to fishing pole holders, and in particular, to a hands-free fishing pole holder configured to automatically set a hook.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman in catching more fish quickly.

One (1) tool utilized by fisherman is that of a stationary fishing rod holder and a tip up. These tools however present various disadvantages and deficiencies related to design and utilization. Particularly, traditional fishing pole holders are not suitably constructed to retain the fishing pole once the line has been struck by a fish and often times leads to loss of the pole. Holders which address this problem fail to allow the pole to pivot in a natural manner. Fishing pole holders also lack a way to visually and audibly indicate that the line has been struck by a fish. Finally, these devices lack a mechanism that automatically sets the hook after the line is struck and the fish begins to swim away when the fisherman is not directly attending to the pole.

SUMMARY OF THE INVENTION

The inventor has recognized the aforementioned inherent problems and lack in the art and observed that there is a need for a fishing pole holder that can securely support a fishing pole in an unattended manner and that provides an automatic hook setting mechanism, which addresses the disadvantages as described above. The development of the present invention substantially departs from the conventional solutions and in doing so fulfills this need.

In accordance with features and aspects of certain embodiments, the hook setting fishing pole holding device includes a stake, a bracket attached to the stake, a pole holder pivotably mounted to the bracket, a clip affixed to the stake and removably attached to the pole holder, and a stop feature disposed on the bracket. The clip releasably retains the pole holder in a generally vertical orientation and the stop feature limits a forward pivotable motion of the pole holder.

In accordance with other features and aspects of the embodiments, the stake includes a shaft, a pointed tip disposed on a lower end of the shaft, and a threaded portion disposed on an upper end of the shaft.

In accordance with other features and aspects of the embodiments, the bracket includes a generally flat connecting member, a pair of parallel flanges extending angularly upward from opposing sides of the connector member, a pair of fastener slots with a fastener slot disposed at an end of each of the flanges, a coupling nut affixed to a bottom surface of the connector plate. The coupling nut is attachable to the upper portion of the stake. The stop feature extends perpendicularly upward from a front edge of the connecting member between the pair of flanges.

In accordance with other features and aspects of the embodiments, the pole holder includes a tubular body having an open top and a closed bottom and a pair of axles protruding outwardly from opposing sides of the body. The axles are pivotably mounted between a pair of flanges of the bracket.

In accordance with other features and aspects of the embodiments, the clip includes a "C"-shaped member having an opposing pair of curved arms and an opening. The "C"-shaped member has an inner diameter slightly larger of than an outer diameter of the body of the pole holder and the opening being suitably sized for insertion of the pole holder body.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4a is a perspective view of a pole holder of the hook setting fishing pole holder; and, FIG. 4b is a section view of the pole holder taken a long section line A-A of FIG. 4a.

Figure 1:
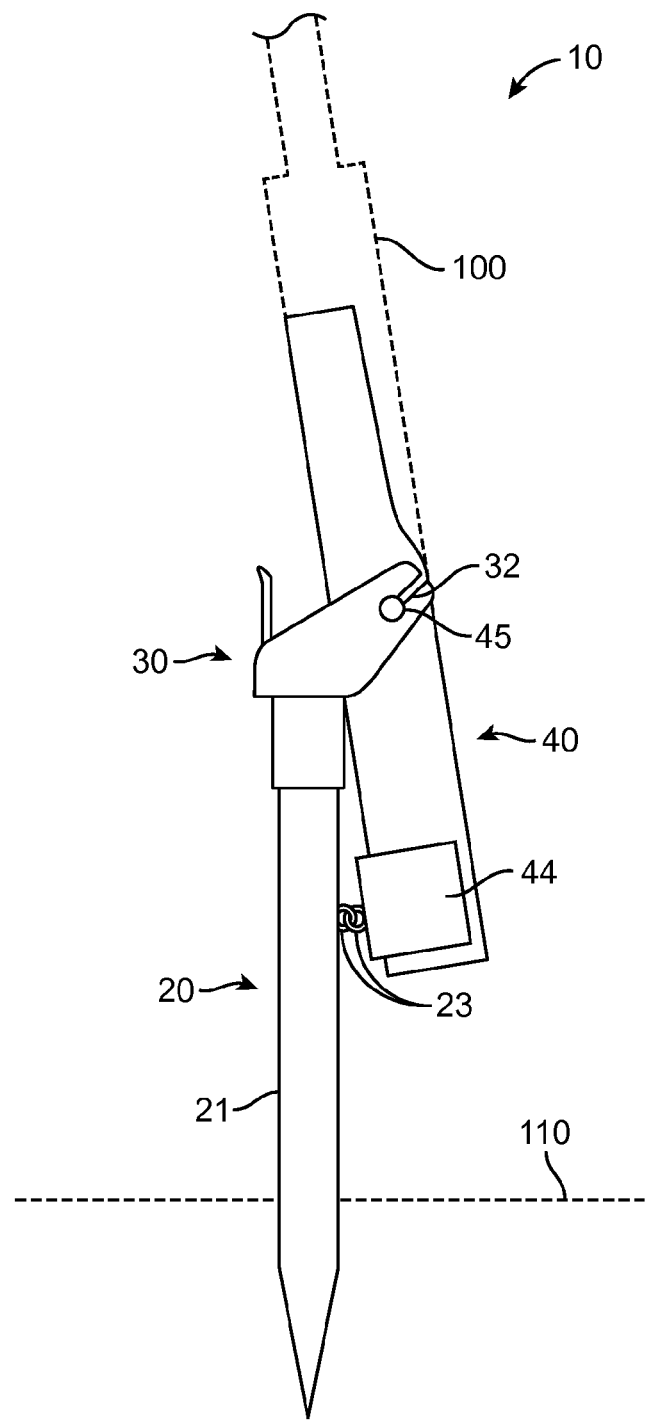
FIG. 1 is an environmental side view of a hook setting fishing pole holder depicted in a ready state, in accordance with the present invention.

DESCRIPTIVE KEY 10 hook setting fishing pole holder
20 stake
21 shaft
22 threaded portion
23 eyelet
30 bracket
31a first flange
31b second flange
32 fastener slot
33 connecting member
34 coupling nut
35 stop feature
40 pole holder
41 body
42 bottom closure
43 fishing pole slot
44 clip
45 axle
47 annular slot
100 fishing pole
110 ground surface

DETAILED DESCRIPTION OF THE PREFERRED EMBODIMENT

In accordance with the invention, the best mode is presented in terms of a preferred embodiment, herein depicted within FIGS. 1 through 4b. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps or functions without precluding one or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 4b, depicting a hook setting fishing pole holder, identified generally by reference to an apparatus 10, where like reference numerals represent similar or like parts. In accordance with the teachings of the present disclosure, the apparatus 10 provides for unattended fishing while along a bank area of a body of water and an automatic hook setting function.

Figure 2:
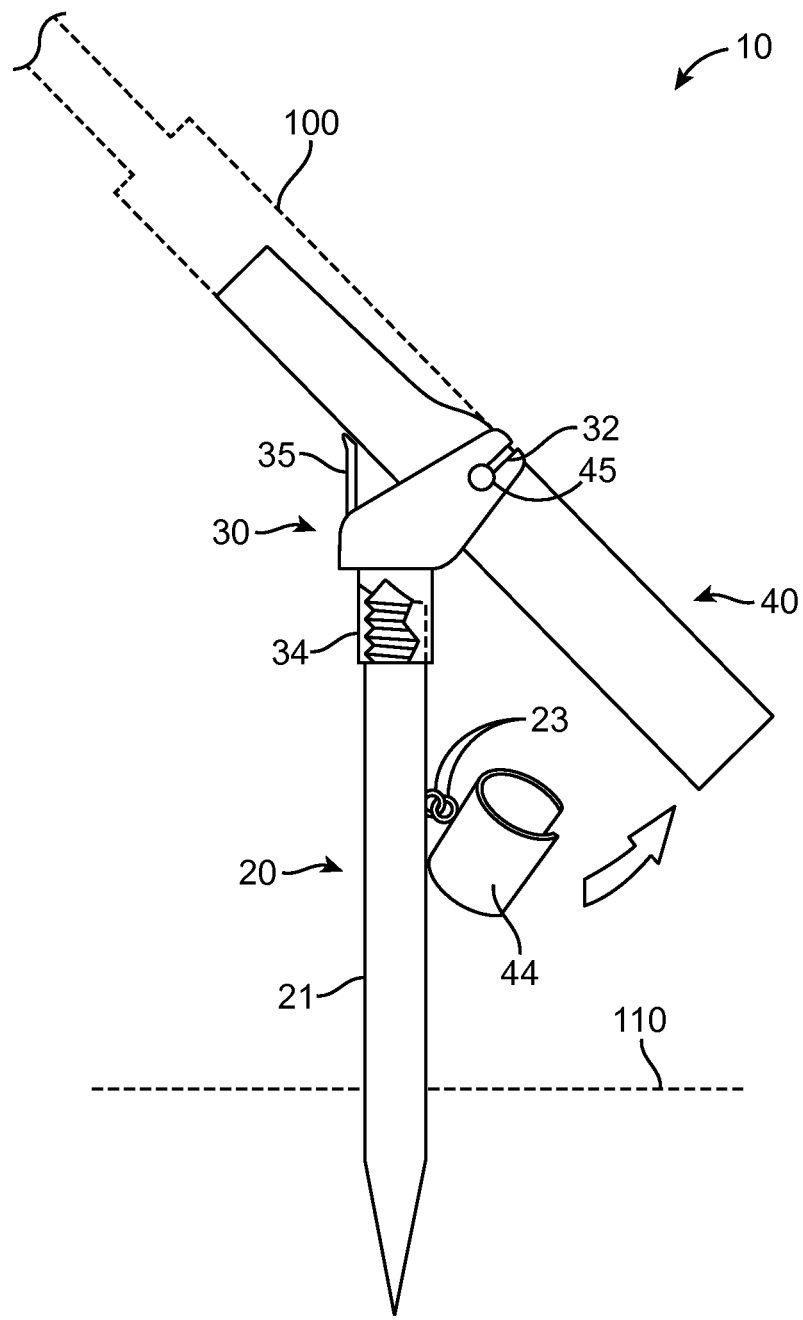
FIG. 2 is an environmental side view of the hook setting fishing pole holder depicted in a tripped state.

Referring generally to FIGS. 1 and 2, the apparatus 10 includes a metal, rod-like anchoring stake 20 having a pointed tip, a "U"-shaped bracket 30 connected to the stake 20, a fishing pole holder 40 mounted to the bracket 30, and a clip 44 releasably secured to the pole holder 40. A fishing pole 100 is inserted within a hollow interior of the pole holder 40 and the fishing pole 100 and pole holder 40, in combination, are retained in a generally vertical orientation at the ready state until the bait and hook is taken by a fish. Upon receiving a force from a fish on the fishing line, the fishing pole 100 and the pole holder 40, in combination, pivot forward against a stop feature 35.

The force applied and forward motion being sufficient in strength to detach the restraining clip 44 from the lower end of the rod holder 40. The forward motion of the fishing pole 100 and the pole holder 40, in combination, is limited by the stop feature 35. The sudden stopping of the fishing pole 100 and the pole holder 40, in combination, upon impact of a front surface of the pole holder 40 with the stop feature 35 enables the hook to set into the fish. The stop feature 35 also retains the pole holder 40 and the fishing pole 100 at a slightly forward angle until the fisherman removes the fishing pole 100 from the apparatus 10 to reel in the fish in a conventional manner.

The clip 44 is a generally "C"-shaped member removably attachable to a lower end of the front surface of the pole holder 40. The opposing curved arms of the clip 44 snuggly wrap at least partially around a body 41 of the pole holder 40. A rear surface of the clip 44 is freely attached to the stake 20 such that it is movable relative to the stake 20. In the example embodiment, the clip 44 is attached to the stake by a pair of conjoined eyelets 23. A first eyelet 23 is threadingly affixed to a side surface of a shaft 21 of the stake 20 and a second eyelet 23 is threadingly attached to the rear surface of the clip 44.

During use, the pole holder 40 is held at a vertical or nearly vertical orientation, in the ready state, by attachment of the clip 44. Upon striking of the hook by a fish, a forwardly directed force is transferred to the pole 110 and the pole holder 40 is forcibly detached from within the clip 44 allowing the pole holder 40 and fishing pole 100, in combination, to pivot forwardly against the stop feature 35. The connected eyelets 23 keep the clip 44 attached to the stake 20 following detachment from the pole holder 40.

Figure 3:
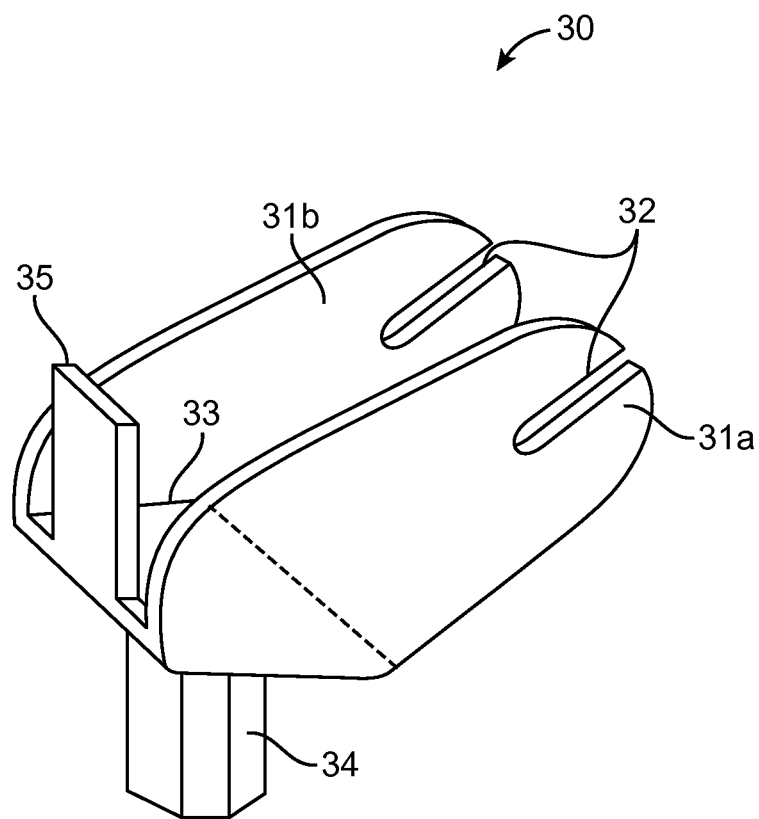
FIG. 3 is a partial exploded view of a bracket of the hook setting fishing pole holder.
Figure 3:
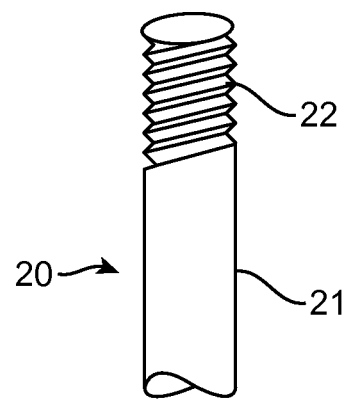

Referring now to FIG. 3, the bracket 30 is a metal, generally "U"-shaped fixture having first flange 31a and a second flange 31b arranged in a parallel and generally vertical manner. The flanges 31a, 31b are connected along a bottom edge by a horizontal connecting member 33. The flanges 31a, 31b each include a respective fastener slot 32 disposed at an end opposite the connecting member 33. A coupling nut 34 is attached to and protrudes downwardly from a bottom surface of the connecting member 33. The coupling nut 34 includes a threaded bore which provides for threaded attachment of a threaded portion 22 of an upper end of the stake 20. The stop feature 35 is integrally formed along a forward edge of the connecting member 33 and protrudes upwardly between the flanges 31a, 31b in order to limit the forward movement of the pole holder 40 in the tripped state, as best seen in FIG. 2.

Figure 4A:
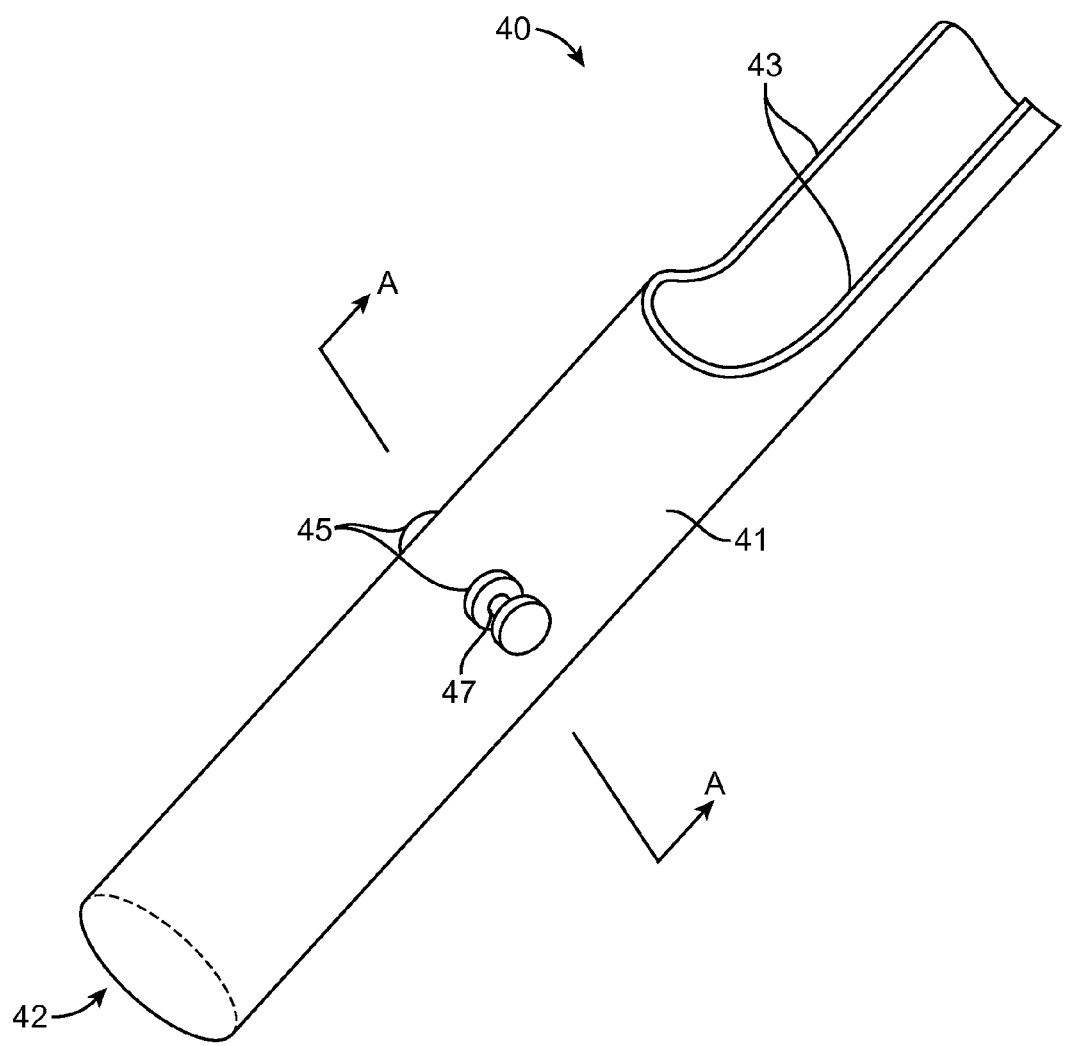

Referring to FIG. 4a, the pole holder 40 is tubular body 41 having an inner diameter suitably sized to snuggly receive a handle portion of the fishing pole 100 and is preferably made from plastic or metal. The pole holder 40 includes an open top having a fishing pole slot 43 which extends from the open top downward along a rear surface to provide for simple insertion of the fishing pole 100 within the hollow interior of the pole holder 40. A bottom end of the pole holder 40 is closed by a perpendicular bottom closure 42 onto which the end of the handle of the fishing pole 100 rests when inserted.

Figure 4B:
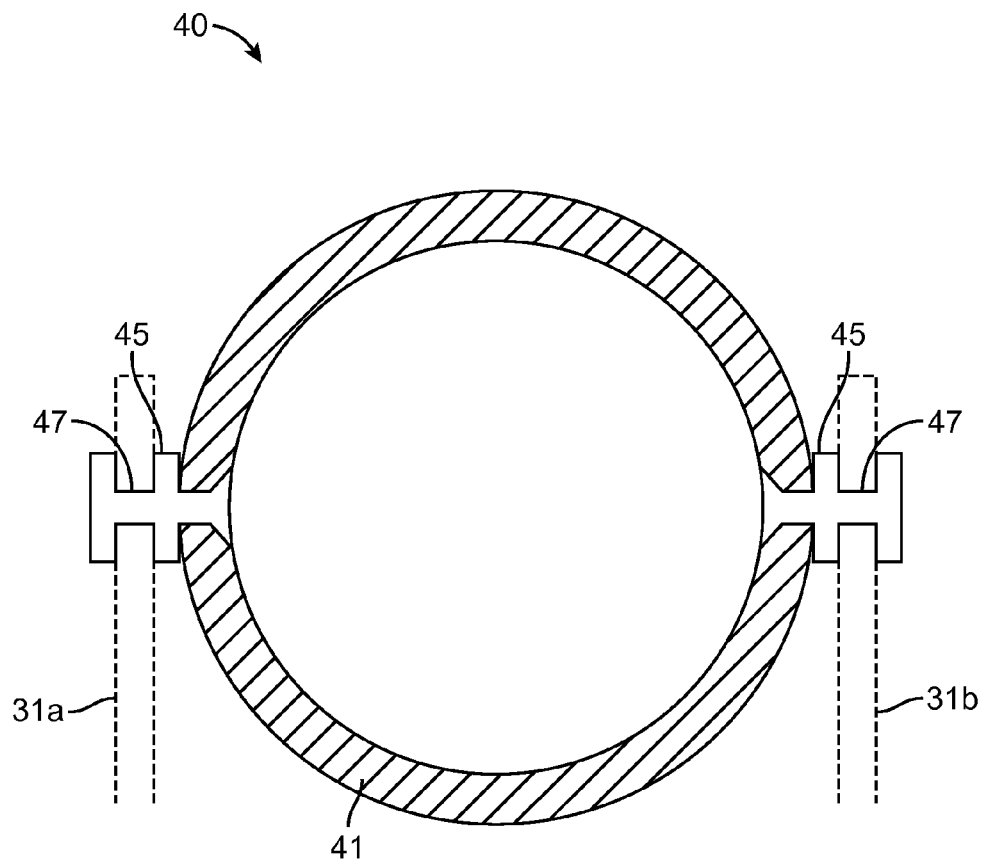

Referring to FIG. 4b, the pole holder 40 is pivotably mounted between the flanges 31a, 31b which allows the pole holder 40 and the fishing pole 100, in combination, to pivot rearwardly and forwardly about the bracket 30. The pole holder 40 includes a pair of opposing integral axles 45 protruding outwardly from opposing sides of the body 41 along a common axis perpendicular to the longitudinal axis of the body 41. The axles 45 are generally spool-shaped members, each having an annular slot 47 designed to receive respective edges of the flanges 31a, 31b when inserted within the fastener slots 32.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the apparatus 10 can be utilized by the user in a simple and effortless manner with little or no training in general accordance with FIG. 1 through FIG. 4b. It can be appreciated that the steps required to utilize the apparatus 10, as described, can performed in alternative order and as such should not be viewed as a limiting factor.

The method of preparing the apparatus 10 to the ready state can be achieved by performing the following steps: procuring the apparatus 10; inserting a pointed end of the stake 20 down into a ground surface 110; threadingly engaging the coupling nut 34 of the bracket 30 to the threaded portion 22 of the stake 20; inserting the axles 45 of the pole holder 40 into respective fastener slot s 32 of the flanges 31a, 31b; attaching the clip 44 to the pole holder 40 by forcing the clip 44 around the body 41 of the clip 44; preparing and casting the fishing pole 100 in a conventional manner; and inserting a handle portion of the fishing pole 100 into the open top end of the pole holder 40. The apparatus 10 is now ready to catch a fish in a hands-free manner.

The method of utilizing the apparatus 10 to catch a fish may be achieved by performing the following steps: using the apparatus 10 to fish in a hands-free manner until hooking a fish and in turn causing the clip 44 to be detached from the pole holder 40; setting a hook into the fish upon contact of the pole holder 40 with the stop feature 35; removing the fishing pole 100 manually from the pole holder 40; and, reeling in the fish using the fishing pole 100 in a conventional manner.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A hook setting fishing pole holding device comprising:
a stake;
a bracket attached to said stake;
a pole holder pivotably mounted to said bracket;
a clip affixed to said stake and removably attached to said pole holder, said clip releasably retaining said pole holder in a generally vertical orientation; and,
a stop feature disposed on said bracket, said stop feature limiting a forward pivotable motion of said pole holder.

2. The device of claim 1, wherein said stake comprises:
a shaft;
a pointed tip disposed on a lower end of said shaft; and,
a threaded portion disposed on an upper end of said shaft.

3. The device of claim 2, wherein said bracket comprises:
a generally flat connecting member;
a pair of parallel flanges extending angularly upward from opposing sides of said connector member;
a fastener slot disposed at an end of each of said flanges;
a coupling nut affixed to a bottom surface of said connector plate, said coupling nut attachable to said threaded portion of said stake; and,
said stop feature extending perpendicularly upward from a front edge of said connecting member between said pair of flanges.

4. The device of claim 3, wherein said pole holder comprises;
a tubular body comprising an open top and a closed bottom; and,
a pair of axles protruding outwardly from opposing sides of said body, said axles are pivotably mounted between said pair of flanges.

5. The device of claim 4, wherein said clip comprises a "C"-shaped member having an opposing pair of curved arms and an opening, said "C"-shaped member having an inner diameter slightly larger of than an outer diameter of said body of said pole holder and said opening being suitably sized for insertion of said pole holder body.

6. The device of claim 1, wherein said bracket comprises:
a generally flat connecting member;
a pair of parallel flanges extending angularly upward from opposing sides of said connector member;
a fastener slot disposed at an end of each of said flanges;
a coupling nut affixed to a bottom surface of said connector plate, said coupling nut attachable to said stake; and,
said stop feature extending perpendicularly upward from a front edge of said connecting member between said pair of flanges.

7. The device of claim 6, wherein said pole holder comprises;
a tubular body comprising an open top and a closed bottom; and,
a pair of axles protruding outwardly from opposing sides of said body, said axles are pivotably mounted between said pair of flanges of said bracket.

8. The device of claim 7, wherein said clip comprises a "C"-shaped member having an opposing pair of curved arms and an opening, said "C"-shaped member having an inner diameter slightly larger of than an outer diameter of a body of said pole holder and said opening being suitably sized for insertion of said pole holder body.

9. The device of claim 8, wherein each fastener slot is linear.

10. The device of claim 1, wherein said pole holder comprises;
a tubular body comprising an open top and a closed bottom; and,
a pair of axles protruding outwardly from opposing sides of said body, said axles are pivotably mounted between a pair of flanges of said bracket.

11. The device of claim 10, wherein said clip comprises a "C"-shaped member having an opposing pair of curved arms and an opening, said "C"-shaped member having an inner diameter slightly larger of than an outer diameter of a body of said pole holder and said opening being suitably sized for insertion of said pole holder body.

12. The device of claim 11, wherein said axles share a common axis perpendicular to a longitudinal axis of said body.

13. The device of claim 12, wherein each of said axles comprises an annular slot slidingly mated within fastener slots disposed at an end of each of said pair of flanges.

14. The device of claim 13, wherein said bracket comprises:
a generally flat connecting member;
said pair of parallel flanges extending angularly upward from opposing sides of said connector member;
said fastener slot disposed at an end of each of said flanges;
a coupling nut affixed to a bottom surface of said connector plate, said coupling nut attachable to said stake; and, said stop feature extending perpendicularly upward from a front edge of said connecting member between said pair of flanges.

15. The device of claim 14, wherein said stake comprises:
a shaft;
a pointed tip disposed on a lower end of said shaft; and,
a threaded portion disposed on an upper end of said shaft and threadably attached to said coupler nut.

16. The device of claim 15, wherein each fastener slot is linear.

17. The device of claim 16, wherein said pole holder body further comprises a semicircular fishing pole slot disposed at a top end.

18. The device of claim 1, wherein said clip comprises a "C"-shaped member having an opposing pair of curved arms and an opening, said "C"-shaped member having an inner diameter slightly larger of than an outer diameter of a body of said pole holder and said opening being suitably sized for insertion of said pole holder body.

19. The device of claim 18, wherein said bracket comprises:
a generally flat connecting member;
a pair of parallel flanges extending angularly upward from opposing sides of said connector member;
a fastener slot disposed at an end of each of said flanges;
a coupling nut affixed to a bottom surface of said connector plate, said coupling nut attachable to said stake; and,
said stop feature extending perpendicularly upward from a front edge of said connecting member between said pair of flanges.

20. The device of claim 19, wherein said stake comprises:
a shaft;
a pointed tip disposed on a lower end of said shaft; and,
a threaded portion disposed on an upper end of said shaft and threadably attached to said coupler nut.

\* \* \* \* \*